United States Patent
Otto et al.

(10) Patent No.: US 10,340,655 B2
(45) Date of Patent: Jul. 2, 2019

(54) OPTICAL WAVEGUIDE AS AMPLIFIER FIBRE FOR HIGH-PERFORMANCE OPERATION

(71) Applicants: Fraunhofer-Gesellschaft Zur Forderung Der Angewandten Forschung E.V., Munich (DE); Friedrich-Schiller-Universitat, Jena (DE)

(72) Inventors: Hans Jurgen Otto, Jena (DE); Cesar Jauregui Misas, Jena (DE); Jens Limpert, Jena (DE); Andreas Tunnermann, Weimar (DE)

(73) Assignees: FRAUNHOFER-GESELLSCHAFT ZUR FÖRDERUNG DER ANGEWANDTEN FORSCHUNG E.V., Munich (DE); FRIEDRICH-SCHILLER-UNIVERSITÄT, Jena (DE)

( * ) Notice: Subject to any disclaimer, the term of this patent is extended or adjusted under 35 U.S.C. 154(b) by 0 days.

(21) Appl. No.: 15/549,416

(22) PCT Filed: Feb. 12, 2015

(86) PCT No.: PCT/EP2015/052987
§ 371 (c)(1),
(2) Date: Aug. 8, 2017

(87) PCT Pub. No.: WO2016/128058
PCT Pub. Date: Aug. 18, 2016

(65) Prior Publication Data
US 2018/0034234 A1    Feb. 1, 2018

(30) Foreign Application Priority Data
Feb. 9, 2015   (DE) .................. 10 2015 101 830

(51) Int. Cl.
*H01S 3/00*   (2006.01)
*H01S 3/16*   (2006.01)
(Continued)

(52) U.S. Cl.
CPC ........ *H01S 3/1603* (2013.01); *H01S 3/06708* (2013.01); *H01S 3/06716* (2013.01);
(Continued)

(58) Field of Classification Search
CPC .... H01S 3/1603; H01S 3/06708; H01S 3/091; H01S 3/08072
(Continued)

(56) References Cited

U.S. PATENT DOCUMENTS 9,653,872 B2 *   5/2017   Di Teodoro ........ H01S 3/06791
2003/0156605 A1   8/2003   Richardson et al.
(Continued)

FOREIGN PATENT DOCUMENTS

WO   2005112206 A1   11/2005

OTHER PUBLICATIONS

International Search Report of the International Searching Authority with English Translation issued in the corresponding PCT International Application No. PCT/EP2015/052987, dated Nov. 2, 2015 (7 pages).
(Continued)

Primary Examiner — Mark Hellner
(74) Attorney, Agent, or Firm — Raymond R. Ferrera; Adams and Reese LLP

(57) ABSTRACT

The invention relates to an optical waveguide (3) as a laser medium or as a gain medium for high-power operation, wherein the optical waveguide (3) is an optical fiber, the light-guiding core of which, at least in sections, is doped with rare earth ions. It is an object of the invention to provide an optical waveguide as a laser or a gain medium, and a
(Continued)

laser/amplifier combination realized therewith, in which the output signal of the laser or gain medium is better stabilized. The invention achieves this object by virtue of the maximum small signal gain of the optical waveguide (1) being up to 60 dB, preferably up to 50 dB, more preferably up to 40 dB, even more preferably up to 30 dB, on account of the concentration of the rare earth ions and/or the distribution thereof in the light-guiding core. Moreover, the invention relates to the use of such an optical waveguide as an amplifier fiber (3) in a laser/amplifier combination.

10 Claims, 1 Drawing Sheet

(51) Int. Cl.
*H01S 3/067* (2006.01)
*H01S 3/091* (2006.01)
*H01S 3/08* (2006.01)
*H01S 3/094* (2006.01)

(52) U.S. Cl.
CPC .......... *H01S 3/06754* (2013.01); *H01S 3/091* (2013.01); *H01S 3/08072* (2013.01); *H01S 3/094003* (2013.01)

(58) Field of Classification Search
USPC ...................................................... 359/341.1
See application file for complete search history.

(56) References Cited

U.S. PATENT DOCUMENTS

2006/0262388 A1* 11/2006 Starodoumov ..... H01S 3/06758
359/341.1
2010/0188734 A1* 7/2010 Grudinin ................ B82Y 20/00
359/341.3

OTHER PUBLICATIONS

Written Opinion of the International Search Authority (Form PCT/ISA/237) with English Translation issued in the corresponding PCT International Application No. PCT/EP2015/052987, dated Nov. 2, 2015 (12 pages).

International Preliminary Report on Patentability Chapter I issued in the corresponding PCT International Application No. PCT/EP2015/052987, dated Aug. 15, 2017 (7 pages).

Peterka P. et al: "Amplifier Performance of Double-Clad Er/Yb-Doped Fiber with Cross-Section Tailored for Direct Splicing to the Pump and Signal Fibers", Optical Fiber Communication (OFC 2007) Collocated National Fiber Optic Engineers Conference: Anaheim, CA, Mar. 25-29, 2007 (3 pages).

Kiushan Zhu et al: "976 nm Single-Polarization Single-Frequency Ytterbium-Doped Phosphate Fiber Amplifiers", IEEE Photonics Technology Letters, Jul. 1, 2013 (4 pages).

* cited by examiner

OPTICAL WAVEGUIDE AS AMPLIFIER FIBRE FOR HIGH-PERFORMANCE OPERATION

The invention relates to an optical waveguide as a laser medium or as a gain medium for high-power operation, wherein the optical waveguide is an optical fiber, the light-guiding core of which, at least in sections, is doped with rare earth ions.

Furthermore, the invention relates to the use of an optical waveguide as a laser medium or a gain medium for high-power operation, wherein the optical waveguide is an optical fiber, the light-guiding core of which, at least in sections, is doped with rare earth ions.

Moreover, the invention relates to a laser/amplifier combination comprising a laser, an amplifier fiber and a pump light source, wherein the pump light source optically pumps the amplifier fiber and wherein the amplifier fiber amplifies the radiation of the laser propagating therein, wherein the core of the amplifier fiber guiding the laser radiation, at least in sections, is doped with rare earth ions.

In the case of a mode instability, a light signal propagating through the optical waveguide becomes unstable above a threshold of the power of the light signal and energy is transferred from a fundamental mode into higher order modes.

In recent times, the development of fiber lasers has led to a reliable concept for an amplifier for e.g. high-power lasers being supplied by optical fibers or optical waveguides that are doped with rare earth ions as an active medium. The development of low-power lasers to high-power lasers for industrial applications is based on the capability of optical waveguides being able to handle high powers. The very good ratio of surface to active volume permits efficient dissipation of heat. This is an excellent precondition for high-power operation.

However, the conditions in the optical waveguide lead to other problems. Thus, for example, the restriction of the light signal to the core of the optical waveguide leads to a high light intensity and to interactions between the material of the optical waveguide and the light signal. In particular, nonlinear effects that are difficult to control also arise in the process. As a result of this, the signal quality is greatly impaired.

Accordingly, optical waveguides should be designed in such a way that nonlinear effects and interactions with the fiber materials are reduced. The easiest and most effective way of reducing nonlinear effects is brought about by increasing the diameter of the core. As a result, firstly, the intensity of the light in the core is reduced and, secondly, the absorption of pump light can be increased. On account of the improved absorption of the pump light, the optical waveguide can be shortened and hence it is possible to further reduce nonlinear effects.

However, in the case of a large core diameter of the optical waveguide, it is difficult to implement a single mode operation, or even an operation with only a few modes, particularly within the scope of high-power operation. It was found that the high thermal load in the high-power operation can lead to mode instability. Here, the output signal of the optical waveguide or of a fiber laser realized therewith becomes unstable as soon as a power threshold is exceeded. In the process, energy is transferred from a fundamental mode to modes of higher order. The beam profile of the radiation propagating in the optical waveguide which, for example, originally had a stable Gaussian form starts to change and the beam profile fluctuates in time on account of a superposition of the fundamental mode with one or more modes of higher order that changes over time. The time behavior of these fluctuations may be deterministic or else, depending on the power of the propagating radiation, random or chaotic. Thermo-optical effects, namely temperature-induced local changes in the refractive index of the material of the optical waveguide, which are caused by mode interference, i.e. by interference between the different modes propagating in the optical waveguide, are considered to be the cause for the mode instability (see Jauregui et al., Opt. Express 19, 2011, pages 3258 to 3271).

Mode instability in optical waveguides at high powers remains a largely unsolved problem to date.

Proceeding herefrom, the invention is based on the object of providing an optical waveguide as a laser medium or gain medium, and a laser/amplifier combination realized therewith, in which the output signal of the amplifier fiber is better stabilized.

Proceeding from an optical waveguide of the type set forth hereinabove, the invention achieves this object by virtue of the maximum small signal gain of the optical waveguide being up to 60 dB, preferably up to 50 dB, more preferably up to 40 dB, even more preferably up to 30 dB, on account of the concentration of the rare earth ions and/or the distribution thereof in the light-guiding core.

The invention is based on the discovery that there is a close link between the maximum small signal gain of the optical waveguide and the power threshold from which a mode instability occurs.

Within the meaning of the invention, the maximum small signal gain of the optical waveguide is understood to mean the maximum possible gain of laser radiation propagating in an optical waveguide, the intensity of which is so low that there is no gain saturation. This maximum possible gain is obtained when the optical waveguide is completely inverted, i.e. when all doping centers are in the upper laser level.

According to the invention, the power threshold from which a mode instability occurs may be substantially increased by lengthening the optical waveguide, with the small signal gain being kept constant (or even reduced in relation to conventional optical waveguides used as an amplifier fiber) at the same time.

The reduction in the maximum small signal gain to less than 60 dB, preferably to even under 30 dB, according to the invention is counter to the way in which fiber laser systems are typically designed. Typically, work is undertaken with a significantly higher small signal gain of the amplifier fiber.

In known laser/amplifier combinations, the power amplification stage is usually operated at complete saturation. The corresponding gain factors therefore lie several orders of magnitude below the small signal gain of the optical waveguide. It is the discovery of the invention that this unused gain, as it were, causes the introduction of mode instability at a comparatively low power of the amplified radiation.

According to the invention, the reduction in the small signal gain can be effectuated by suitable selection of the doping, i.e. of the concentration of the rare earth ions in the material of the optical waveguide. It is likewise possible to choose the geometric distribution of the rare earth ions within the light-guiding core region of the optical waveguide in such a way that the overlap of the propagating radiation modes with the doped core regions yields the desired small signal gain. Both variants may also be combined with one another.

In preferred configurations of the invention, further measures may be added in order to further increase the power threshold above which mode instability occurs. Thus, for example, the wavelength of the radiation to be amplified may lie away from the wavelength, preferably below the wavelength, at which the wavelength-dependent gain of the amplifier fiber is at maximum. Alternatively, or in a complementary manner, the wavelength of the light of a pump light source, by means of which the amplifier fiber is optically pumped, can be chosen in such a way that the wavelength of the pump light lies away from the wavelength, preferably above the wavelength, at which the absorption of the amplifier fiber is at a maximum.

As explained above, the problems relating to mode instability occur during the high-power operation, i.e. at particularly high powers of the amplified laser radiation. This relates, in particular, to the power range above a mean power of 100 W. By way of the invention, it is possible to realize laser/amplifier combinations in which the mean power of the amplified laser radiation is 10 kW or even more, without mode instability occurring.

Expressed differently, the invention relates to the use of an optical waveguide that is doped with rare earth ions, as an amplifier fiber for high-power operation (i.e. more than 100 W mean power, preferably more than 500 W), wherein the small signal gain is less than 60 dB, optionally even less than 30 dB, on account of the doping of the optical waveguide.

Further features, details and advantages of the invention emerge from the wording of the claims and the following description of exemplary embodiments on the basis of the figures. In the figures:

Figure 1:
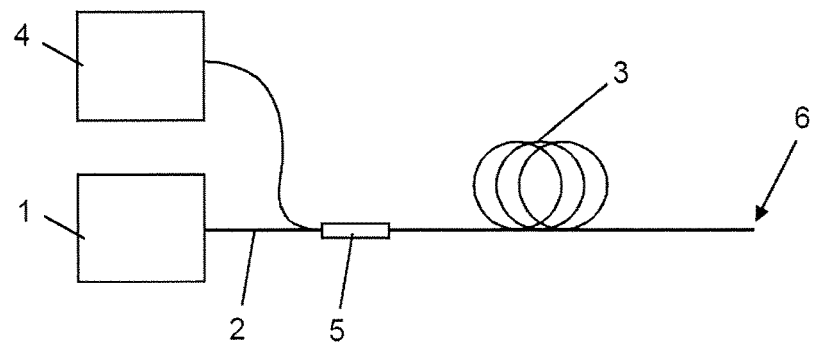
FIG. 1 shows a schematic view of a laser/amplifier combination according to the invention.

The laser/amplifier combination shown in FIG. 1 comprises a laser 1, preferably in the form of a fiber laser which produces laser radiation at a low intensity and outputs said laser radiation to an optical fiber 2 by way of a coupling. The laser 1 can be a continuous wave laser or else a pulsed laser. The radiation produced by the laser 1 propagates—possibly after passing through one or more preamplifier stages (not depicted here)—in an amplifier fiber 3 and is amplified in it to the desired power. To this end, the laser-radiation-guiding core of the amplifier fiber 3 is doped with rare earth ions. The amplifier fiber 3 is optically pumped by means of a pump light source 4. The light from the pump light source 4 is coupled in a manner known per se into the amplifier fiber 3 by way of a coupler 5. The pump light then propagates in the amplifier fiber 3 together with the laser radiation to be amplified. The mean power of the laser radiation at the output 6 of the amplifier fiber is more than 100 W, possibly even 10 kW or more. In order to avoid mode instability, the maximum small signal gain of the amplifier fiber 3 is less than 60 dB, possibly even less than 30 dB, as a result of a suitable choice of the concentration of the rare earth ions and/or a suitable geometric distribution in the laser-radiation-guiding core.

Figure 2:
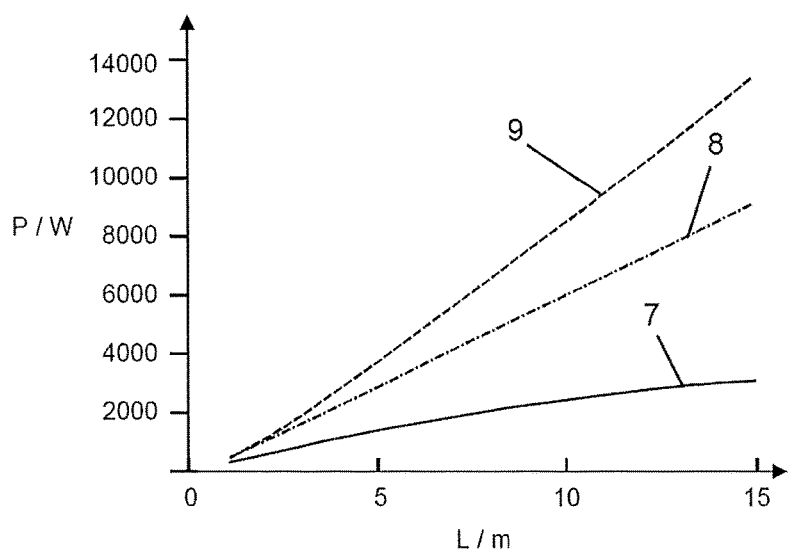
FIG. 2 shows a diagram for elucidating the dependence of the mode instability on the gain.

The diagram in FIG. 2 illustrates the dependence of the power threshold, above which mode instability occurs, on the small signal gain of the amplifier fiber and on the length of the amplifier fiber. In the diagram, the power threshold P (in watt), above which mode instability occurs, is plotted as a function of the fiber length (in meters). The solid curve denoted by 7 shows the behavior of a conventional amplifier fiber. In the case where the amplifier fiber has a length of 15 m, mode instability occurs when the power of the amplified radiation is above 3 kW. In the case of a smaller small signal gain, the power threshold P is significantly increased. The curve 8 shows the behavior of an amplifier fiber whose small signal gain is only 35 dB (in this case at a wavelength of 1030 nm). Mode instability only occurs above approximately 9 kW in the case of a fiber length of 15 m. The curve 9 shows the behavior of a fiber whose small signal gain is even only 22 dB (at 1010 nm). In the case where the length of the amplifier fiber is 15 m, the power threshold P already lies at 13 kW.

All of this shows that, according to the invention, it is possible to obtain a stable operation (without mode instability) by using an optical waveguide as an amplifier fiber for high-power operation, wherein the maximum small signal gain of the optical waveguide is reduced to less than 60 dB, preferably into the region of 30 dB or less.

The invention claimed is:

1. A laser/amplifier device comprising a laser, an amplifier fiber and a pump light source, wherein the pump light source optically pumps the amplifier fiber and wherein the amplifier fiber amplifies the radiation of the laser-propagating therein, wherein the core of the amplifier fiber guiding the laser radiation, at least in sections, is doped with rare earth ions, wherein the maximum small signal gain of the amplifier fiber is up to 60 dB on account of at least one of the concentration of the rare earth ions and the distribution thereof in the light-guiding core, and wherein the mean power of the laser radiation at the output of the amplifier fiber is at least 100 W.

2. The device of claim 1, wherein the wavelength of the laser radiation lies away from the wavelength, at which the wavelength-dependent gain of the amplifier fiber is at maximum.

3. The device of claim 1, wherein the wavelength of the light of the pump light source lies away from the wavelength, at which the absorption of the amplifier fiber is at maximum.

4. The device of claim 1, wherein the mean power of the laser radiation at the output of the amplifier fiber is at least 500 W.

5. The device of claim 1, wherein the mean power of the laser radiation at the output of the amplifier fiber is at least 1 kW.

6. The device of claim 1, wherein the mean power of the laser radiation at the output of the amplifier fiber is at least 10 kW.

7. The device of claim 1, wherein the wavelength of the laser radiation lies below the wavelength, at which the wavelength-dependent gain of the amplifier fiber is at maximum.

8. The device of claim 1, wherein the maximum small signal gain of the amplifier fiber is up to 50 dB.

9. The device of claim 1, wherein the maximum small signal gain of the amplifier fiber is up to 40 dB.

10. The device of claim 1, wherein the maximum small signal gain of the amplifier fiber is up to 30 dB.

* * * * *